US012565847B1

(12) United States Patent
Lefebvre et al.

(10) Patent No.: US 12,565,847 B1
(45) Date of Patent: Mar. 3, 2026

(54) AIRCRAFT ENGINE HAVING A SCROLL CASE AND A TURBINE SUPPORT CASE SECURED TOGETHER

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/926,574

(22) Filed: Oct. 25, 2024

(51) Int. Cl.
*F01D 25/28* (2006.01)
*F01D 25/24* (2006.01)

(52) U.S. Cl.
CPC ........... *F01D 25/28* (2013.01); *F01D 25/243* (2013.01); *F05D 2220/323* (2013.01); *F05D 2240/14* (2013.01); *F05D 2260/31* (2013.01)

(58) Field of Classification Search
CPC ...... F01D 9/026; F01D 25/162; F01D 25/243; F01D 25/30; F01D 25/12; F01D 25/24; F01D 13/02; F01D 9/065; F01D 25/04; F01D 25/28; F01D 5/26; F01D 9/023; F01D 9/041; F01D 11/005; F01D 11/08; F01D 17/146; F01D 25/14; F01D 25/125; F01D 25/164; F01D 5/043; F05D 2220/323; F05D 2220/40; F05D 2250/51; F05D 2240/14; F05D 2260/96; F05D 2220/32; F05D 2230/60; F05D 2210/43; F05D 2240/12; F05D 2240/50; F05D 2240/60; F05D 2240/55; F05D 2250/15; F05D 2250/312; F05D 2260/31; F02C 6/12; F02C 5/06; F02C 7/28
See application file for complete search history.

(56) References Cited

U.S. PATENT DOCUMENTS

| | | | | |
|---|---|---|---|---|
| 5,186,006 A * | 2/1993 | Petty | ....................... F01D 9/023 | 60/753 |
| 7,731,426 B2 * | 6/2010 | Meacham | ............... F16C 27/04 | 384/535 |

(Continued)

FOREIGN PATENT DOCUMENTS

| | | |
|---|---|---|
| WO | 2015195343 | 12/2015 |
| WO | 2017128959 | 8/2017 |

*Primary Examiner* — Eric J Zamora Alvarez
(74) *Attorney, Agent, or Firm* — NORTON ROSE FULBRIGHT CANADA LLP

(57) ABSTRACT

An aircraft engine, has: a turbine rotatable about a central axis; a scroll case having an inlet and an outlet connected to the turbine, and a conduit extending around the central axis from the inlet to the outlet; a bearing housing extending around the central axis and including a support flange; and a turbine support case secured to the bearing housing, the turbine support case having spokes distributed around the central axis and extending along a direction having an axial component relative to the central axis, the spokes extending through the scroll case and radially supported by the bearing housing, one of the turbine support case and the scroll case defining lugs circumferentially distributed around the central axis, the other of the turbine support case and the scroll case defining slots, the turbine support case and the scroll case circumferentially locked to one another via the lugs engaging the slots.

20 Claims, 9 Drawing Sheets

(56) References Cited

U.S. PATENT DOCUMENTS

| | | | | |
|---|---|---|---|---|
| 9,057,269 | B2 | 6/2015 | Bush | |
| 10,053,995 | B2 * | 8/2018 | Grissom | F02B 39/08 |
| 10,400,617 | B2 | 9/2019 | Akiyama et al. | |
| 10,519,806 | B2 | 12/2019 | Yokoshima et al. | |
| 11,293,292 | B2 | 4/2022 | Smoke et al. | |
| 11,408,304 | B2 * | 8/2022 | Lefebvre | F01D 25/162 |
| 12,055,091 | B2 | 8/2024 | Miyoshi et al. | |
| 12,065,950 | B1 * | 8/2024 | Lefebvre | F01D 25/24 |
| 2016/0376928 | A1 * | 12/2016 | Lefebvre | B01F 23/19 60/317 |
| 2023/0417174 | A1 * | 12/2023 | Lefebvre | F04D 29/386 |
| 2024/0182178 | A1 * | 6/2024 | Lefebvre | F02C 6/206 |

* cited by examiner

AIRCRAFT ENGINE HAVING A SCROLL CASE AND A TURBINE SUPPORT CASE SECURED TOGETHER

TECHNICAL FIELD

The disclosure relates generally to aircraft engines and, more particularly, to a turbine support case for such engines.

BACKGROUND

In some engine architectures, aerodynamic flow distributors, such as scroll or volute structures, are used to receive combustion gases and to regulate them in a suitable manner before the combustion gases meet stator vanes or rotor blades of the downstream turbine(s). Such structures are subjected to thermal growth, which may have some various effects on surrounding components. Improvements are therefore sought.

SUMMARY

In one aspect, there is provided an aircraft engine, comprising: a turbine including a turbine rotor rotatable about a central axis; a scroll case having an inlet fluidly connected to a source of combustion gases and an outlet fluidly connected to the turbine, and a conduit extending around the central axis from the inlet to the outlet; a bearing housing extending around the central axis, the bearing housing including a support flange; and a turbine support case secured to the bearing housing, the turbine support case having spokes distributed around the central axis and extending along a direction having an axial component relative to the central axis, the spokes extending through the scroll case and radially supported by the bearing housing, one of the turbine support case and the scroll case defining lugs circumferentially distributed around the central axis, the other of the turbine support case and the scroll case defining slots, the turbine support case and the scroll case circumferentially locked to one another via the lugs engaging the slots.

The aircraft engine described above may include any of the following features, in any combinations.

In some embodiments, the slots have slot openings facing a radial direction selected to allow radial expansion of the scroll case relative to the turbine support case, the scroll case movable radially relative to the turbine support case via a sliding engagement of the lugs within the slots.

In some embodiments, the slots are defined by the turbine support case and the lugs are defined by the scroll case.

In some embodiments, the turbine support case includes an annular axial wall, the spokes protruding axially from the annular axial wall, each of the slots defined between a pair of protrusions projecting from the annular axial wall.

In some embodiments, a sealing member is located radially inwardly of the slots and of the lugs and axially between an annular axial wall of the turbine support case and the scroll case.

In some embodiments, the sealing member is a corrugated seal.

In some embodiments, the support flange defines an annular tab located radially outwardly of the spokes, an annular gap defined axially between the annular tab and the scroll case, a sealing member located axially between the bearing housing and the scroll case to seal the annular gap and radially inwardly of the annular tab.

In some embodiments, the scroll case includes vanes extending in a direction having an axial component relative to the central axis and across the conduit.

In some embodiments, each of the spokes extends within a respective one of the vanes.

In some embodiments, the spokes are free of connection to the vanes.

In another aspect, there is provided a turbine assembly, comprising: a turbine including a turbine rotor rotatable about a central axis; a support structure; a scroll case for receiving combustion gases and for directing the combustion gases to the turbine, the scroll case having a conduit extending around the central axis; and a turbine support case having spokes distributed around the central axis, the spokes extending through the conduit of the scroll case and radially supported by the support structure, lug and slot connections defined between the turbine support case and the scroll case to circumferentially lock the turbine support case to the scroll case.

The turbine assembly described above may include any of the following features, in any combinations.

In some embodiments, the lug and slot connections includes slots defined by one of the turbine support case and the scroll case, and lugs defined by the other of the turbine support case and the scroll case, the slots having slot openings facing a radial direction to allow expansion of the scroll case relative to the turbine support case, the scroll case movable radially relative to the turbine support case via a sliding engagement of the lugs within the slots.

In some embodiments, the slots are defined by the turbine support case and the slots are defined by the scroll case.

In some embodiments, the turbine support case includes an annular axial wall, the spokes protruding axially from the annular axial wall, each of the slots defined between a pair of protrusions projecting from the annular axial wall.

In some embodiments, a sealing member is located radially inwardly of the slots and of the lugs and axially between an annular axial wall of the turbine support case and the scroll case.

In some embodiments, the sealing member is a corrugated seal.

In some embodiments, the support structure defines an annular tab located radially outwardly of the spokes, an annular gap defined axially between the annular tab and the scroll case, a sealing member located axially between the support structure and the scroll case to seal the annular gap and radially inwardly of the annular tab.

In some embodiments, the scroll case includes vanes extending in a direction having an axial component relative to the central axis and across the conduit.

In some embodiments, each of the spokes extends within a respective one of the vanes.

In some embodiments, the spokes are free of connection to the vanes.

BRIEF DESCRIPTION OF THE DRAWINGS

Reference is now made to the accompanying figures in which.

DETAILED DESCRIPTION

Figure 1:
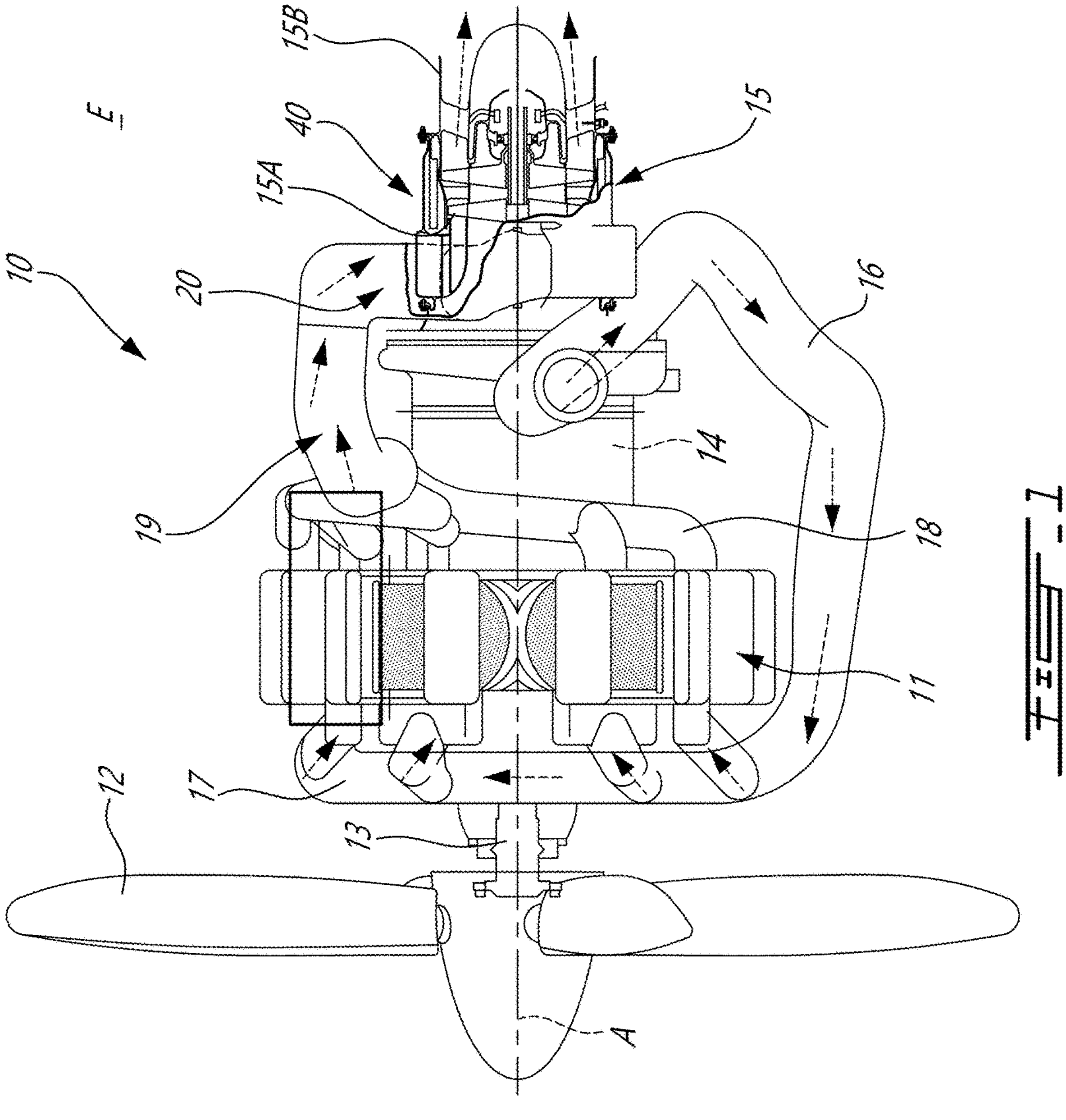
FIG. 1 is a schematic side view of an aircraft engine.

Referring to FIG. 1, an aircraft engine 10 is schematically shown. The aircraft engine 10 comprises a thermal engine module 11 including one or more internal combustion engine(s), drivingly engaged to a rotatable load 12, herein depicted as a propeller, via an output shaft 13. It will be appreciated that the thermal engine module 11 may include any suitable engine, such as a gas turbine engine, a rotary engine, a piston engine, and so on. The output shaft 13 may correspond to an engine shaft of the thermal engine module 11. The thermal engine module 11 may include any engine having at least one combustion chamber of varying volume. For instance, the thermal engine module 11 may comprise one or more piston engine(s) or one or more rotary engine(s) (e.g., Wankel engines). The aircraft engine 10 further includes a compressor 14 having a compressor inlet receiving ambient air from the environment E outside the aircraft engine 10 and a compressor outlet fluidly connected to an air inlet of the thermal engine module 11. The compressor 14 outputs compressed air from the compressor outlet to the thermal engine module 11 via a compressed air conduit 16 and a manifold 17. The compressed air conduit 16 and the manifold 17 may include any suitable arrangement of pipes configured to distribute compressed air between the different combustion chambers of the thermal engine module 11. Any other suitable configurations used to supply compressed air to the thermal engine module 11 are contemplated without departing from the scope of the present disclosure. The aircraft engine 10 further includes a turbine assembly 15 having an axially facing turbine inlet 15A fluidly connected to an engine outlet of the thermal engine module 11. The turbine 15 has a turbine exhaust case 15B via which combustion gases are expelled to the environment E. The turbine exhaust case 15B may include a tailpipe or any other suitable structures (e.g., exhaust mixer) for discharging the combustion gases from the aircraft engine 10. In some embodiments, the aircraft engine 10 may be a hybrid engine including an electric motor drivingly engaged to the output shaft 13 to assist the thermal engine module 11 in driving the output shaft 13 and the rotatable load (e.g., propeller 12) mounted thereto.

Figure 2:
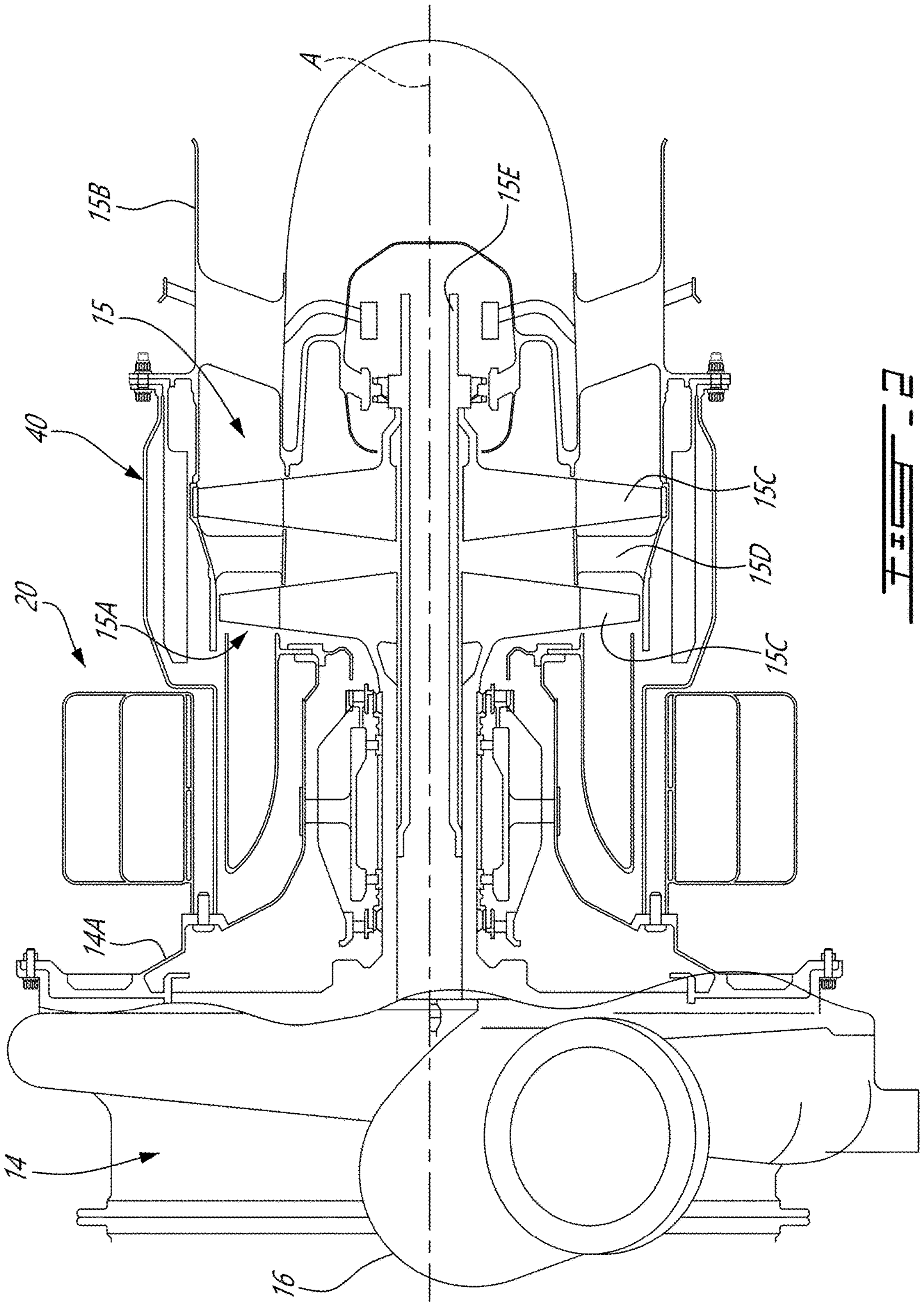
FIG. 2 is a side cross-sectional view of a portion of the aircraft engine of FIG. 1 illustrating a hot section of the aircraft engine.

Referring jointly to FIGS. 1-2, in one or more embodiment(s), the turbine 15 includes an axial turbine having successive rows of rotor(s) 15C and stator(s) 15D disposed in alternation along a central axis A of the aircraft engine 10. The rotor(s) 15C may include rotor blades mounted to rotor discs. The stator(s) 15D may include stator vanes secured at opposite ends to inner and outer shrouds. In other words, the turbine 15 may include a plurality of stages each including a stator and a rotor. The rotors 15C of the turbine 15 are in driving engagement with a turbine shaft 15E. The turbine shaft 15E may be drivingly engaged to the output shaft 13, which may correspond to the engine shaft of the thermal engine module 11. Therefore, the turbine 15 may compound power with the thermal engine module 11 to drive the rotatable load 12. In other words, the turbine shaft 15E may be drivingly engaged to the engine shaft of the thermal engine module 11 via suitable gearing. In the embodiment shown, the turbine shaft 15E is drivingly engaged to a compressor shaft of the compressor 14. Thus, the turbine 15 may drive both the rotatable load 12 and the compressor 14. In the exemplified embodiment, the engine shaft of the thermal engine module 11, the output shaft 13, and the turbine shaft 15E are all coaxial about the central axis A. However, in other configurations, the turbine 15 and/or the compressor 14 may have respective shafts radially offset from one another relative to the central axis A.

As shown in FIG. 1, the engine outlet of the thermal engine module 11 is fluidly connected to an exhaust manifold 18 that receives combustion gases outputted by the combustion chambers or by a combustor of the thermal engine module 11. The exhaust manifold 18 collects the combustion gases from the different combustion chambers and flows these combustion gases to a combustion engine exhaust pipe 19 that feeds the combustion gases to the turbine 15. In other words, the engine outlet of the thermal engine module 11 is fluidly connected to the turbine inlet 15A via the exhaust manifold 18 and the combustion engine exhaust pipe 19. Any other suitable configurations used to supply combustion gases to the turbine 15 are contemplated without departing from the scope of the present disclosure.

As schematically depicted by the flow arrows in FIG. 1, the combustion gases are flowing within the combustion engine exhaust pipe 19 and reach the turbine 15 in a direction being mainly radial relative to the central axis A and which may include a circumferential component relative to the central axis A. However, the turbine 15 includes an axial turbine and therefore the turbine inlet 15A receives the combustion gases along a direction being mainly axial relative to the central axis A. To redirect the combustion gases from a direction being mainly radial to a direction being mainly axial, that is, to decrease a radial component of a direction of the combustion gases, the aircraft engine 10 further includes a scroll case 20 that regulates and reorients the combustion gases so that they meet an upstream most of the stages of the turbine 15 at the most appropriate angle of attack. In the embodiment shown, the flow of combustion gases exiting the scroll case 20 meets a first stage rotor 15C of the turbine 15 before meeting a stator thereof. The scroll case 20 may therefore be used to adequately orient the combustion gases at the most appropriate angle to meet the upstream-most airfoils of the turbine 15, which are herein part of one of the first stage rotors 15C.

Figure 3:
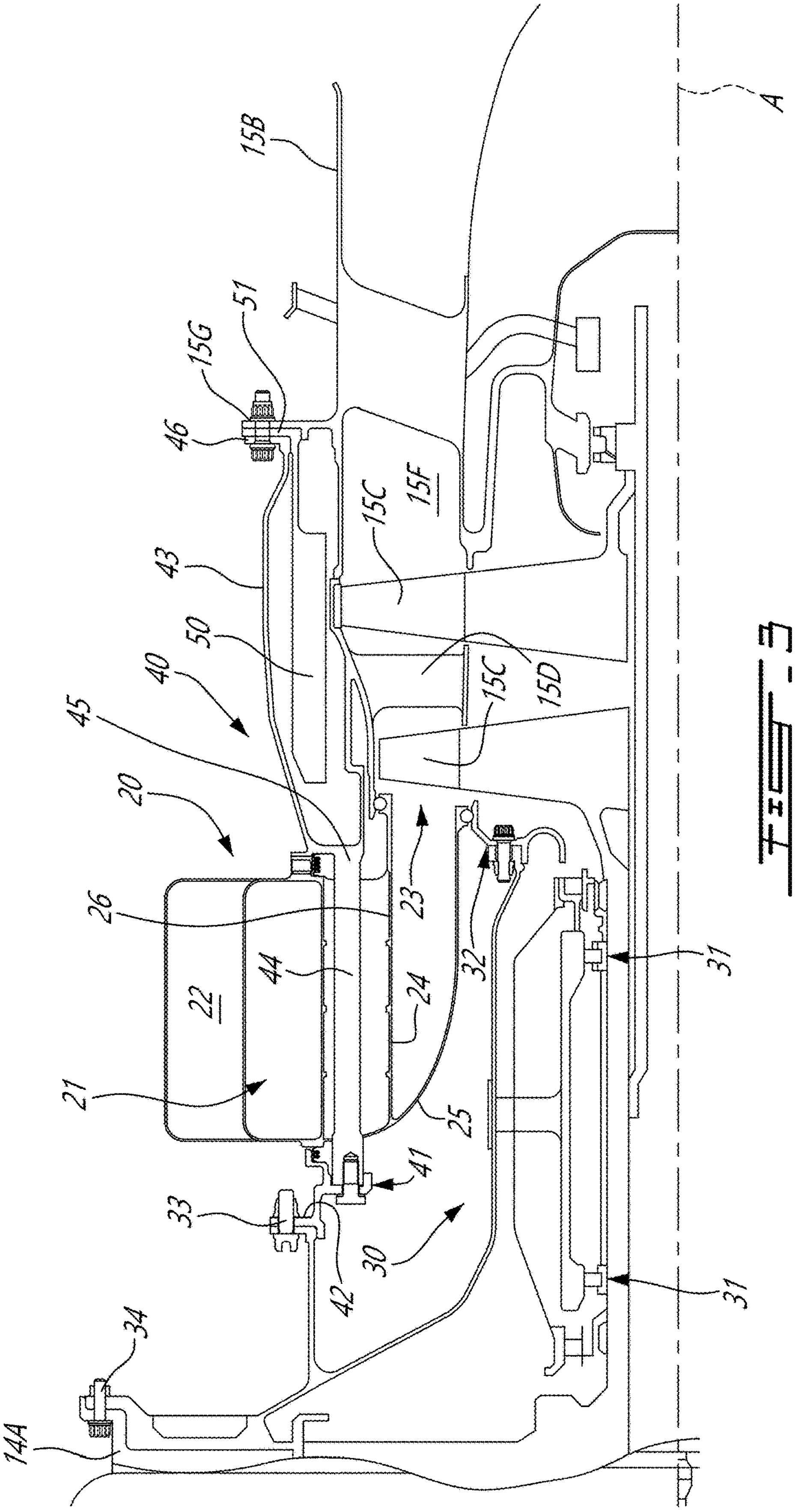
FIG. 3 is an enlarged view of a portion of FIG. 2.

Referring to FIG. 3, as shown in the exemplified embodiment, the scroll case 20 may be provided in form of a unitary body or mono-case comprising a conduit 21 extending around the central axis A from an inlet 22 to an outlet 23. The inlet 22 is fluidly connected to the combustion engine exhaust pipe 19, whereas the outlet 23 is fluidly connected to the turbine inlet 15A (FIG. 2) of the turbine 15. According to the illustrated embodiment, the inlet 22 of the conduit 21 has a tangential component and the outlet 23 is an annular outlet facing axially in a rearward direction and in alignment with an annular gas path 15F of the turbine 15. This configuration allows injecting the combustion gases in a direction being mainly axial relative to the central axis A to meet the axial inlet of the turbine 15. Vanes 24 may be provided in the conduit 21 to direct and regulate the flow of combustion gases. The vanes 24 may be omitted in some embodiments. The conduit 21 of the scroll case 20 is in this embodiment disposed axially forwardly of the turbine 15.

The conduit 21 comprises a non-axisymmetric portion extending downstream from the inlet 22 and spiraling towards the central axis A. As it progresses circumferentially around the central axis A, the non-axisymmetric portion of the conduit 21 transitions or merges with an axisymmetric portion, which forms a 360 degrees axisymmetric structure around the central axis A. The axisymmetric portion extends downstream from the non-axisymmetric portion to the outlet 23.

The inventors have found that in engine running conditions, the thermal distortions are non-uniform in the non-axisymmetric portion of the scroll case 20. Consequently, using the scroll case 20 to secure the turbine exhaust case 15B may increase tip clearance of the rotors 15C of the turbine 15. In other words, radial thermal growth of the scroll case 20 during use of the engine may move the turbine exhaust case 15B radially outwardly, thus pulling radially on shrouds disposed around the rotors 15C. This may increase tip clearance and, as a result, may impair performance. As will be seen hereafter, a turbine support case arrangement may be used to alleviate these drawbacks.

As illustrated on FIG. 3, a compressor case 14A of the compressor 14 is radially supported by a bearing housing 30. It will be appreciated that that any suitable support structure may be used for support the compressor case 14A. For instance, the support structure may be any static component of the engine, such as a support flange and so on. Bearings 31 are rollingly engaged to the bearing housing 30 and radially support a shaft of the engine. The scroll case 20 is secured to a rear end 32 of the bearing housing 30. In the exemplified embodiment, the scroll case 20 has a radially-inner wall 25 that defines a flange at its rear end. The flange of the radially-inner wall 25 is received within an annular groove defined by the rear end 32 of the bearing housing 30. Other configurations are however contemplated. Therefore, the scroll case 20 may not rely on the turbine exhaust case 15B for structural support.

In the disclosed embodiment, a turbine support case 40 is used to secure the turbine exhaust case 15B to the compressor case 14A of the compressor 14. As will be explained below, the turbine support case 40 is independent from the scroll case 20 such that thermal growth of the scroll case 20 may not be transmitted to the turbine exhaust case 15B. Therefore, the turbine exhaust case 15B is secured to the compressor case 14A via the turbine support case 40 independently of the scroll case 20. In the present disclosure, the expression "independent" or "independently" in "independently of the scroll case 20" implies that a load path extends from the compressor case 14A to the turbine exhaust case 15B through the turbine support case 40 without intersecting the scroll case 20. The scroll case 20 is therefore free from intersection to the load path from the compressor case 14A to the turbine exhaust case 15B. The scroll case 20 is thus not part of the load path from the compressor case 14A to the turbine exhaust case 15B and loads generated by the turbine 15 on the turbine exhaust case 15B are transmitted to the compressor case via the turbine support case 40 without assistance from the scroll case 20. The scroll case 20 is thus outside the load path that extends through the turbine support case 40. The scroll case 20 may thus be structurally floating relative to the turbine support case 40.

Figure 4:
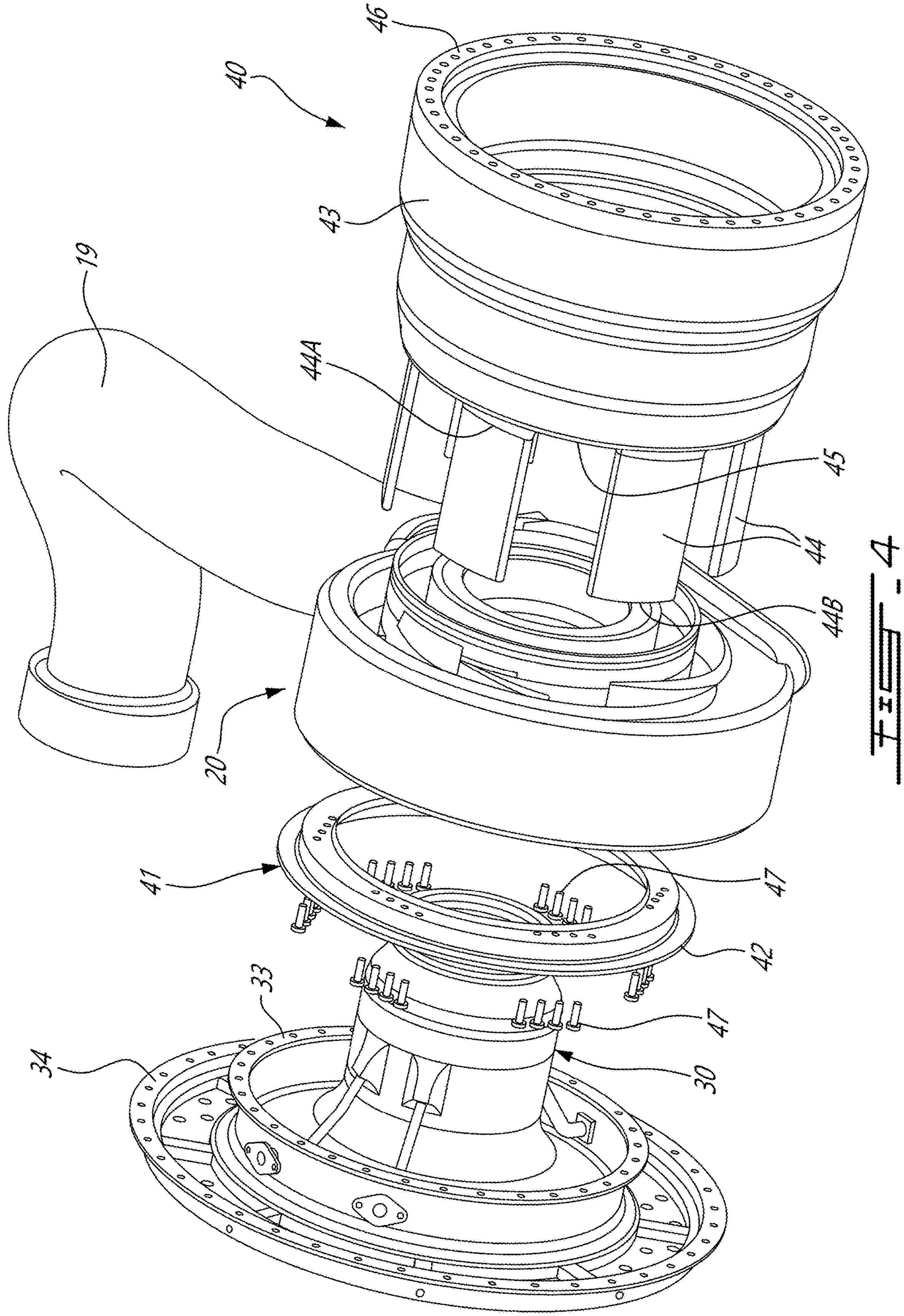
FIG. 4 is a three-dimensional exploded view of a turbine assembly for the aircraft engine of FIG. 1, including a bearing housing, a scroll case, and a turbine support case.

Referring to FIG. 4, the turbine support case 40 has a portion that axially overlaps the scroll case 20 and is secured to an annular member 41, which is itself secured to the bearing housing 30 or any other suitable support structure. More specifically, the annular member 41 has a flange 42 secured (e.g., bolted) to a first flange 33 of the bearing housing 30. The bearing housing 30 further has a second flange 34, which may be disposed radially outwardly of the first flange 33 and axially offset from the first flange 33, for being secured (e.g., bolted) to a mating flange of the compressor case 14A.

The turbine support case 40 includes a wall 43 extending around the central axis A. The wall 43 may be cylindrical, frustoconical, or any other suitable shape. The wall 43 may extend a full circumference around the central axis A. The turbine support case 40 further includes spokes 44 protruding from the wall 43. More specifically, the turbine support case 40 includes an annular axial wall 45 extending radially inwardly from the wall 43. The spokes 44 protrude in a direction having an axial component relative to the central axis A from the annular axial wall 45 and away from the wall 43. The spokes 44 may be parallel to the central axis A. An annular flange 46 is provided at a rear end of the wall 43 and is secured (e.g., bolted) to a mating flange 15G (FIG. 3) of the turbine exhaust case 15B.

As shown in FIG. 3, the wall 43 axially overlaps at least a portion of the turbine 15. A containment ring 50 may be secured to the flange 15G of the turbine exhaust case 15B via containment ring flange 51, which may be sandwiched between the annular flange 46 of the turbine support case 40 and the flange 15G of the turbine exhaust case 15B. The containment ring 50 is, in this embodiment, disposed radially between the wall 43 of the turbine support case 40 and at least one of the rotors 15C of the turbine 15.

The spokes 44, six in the illustrated embodiment, but more or less may be used, extend from proximal ends 44A at the annular axial wall 45 to distal ends 44B. The distal ends 44B of the spokes 44 are secured to the annular member 41 as will be explained further below. The distal ends 44B of the spokes define threaded apertures threadingly engageable by fasteners 47 (e.g., bolts) extending through correspondingly-shaped apertures defined through the annular member 41 and threadingly engaged to the threaded apertures for securing the spokes 44 to the annular member 41, which is itself secured to the bearing housing 30.

Figure 5:
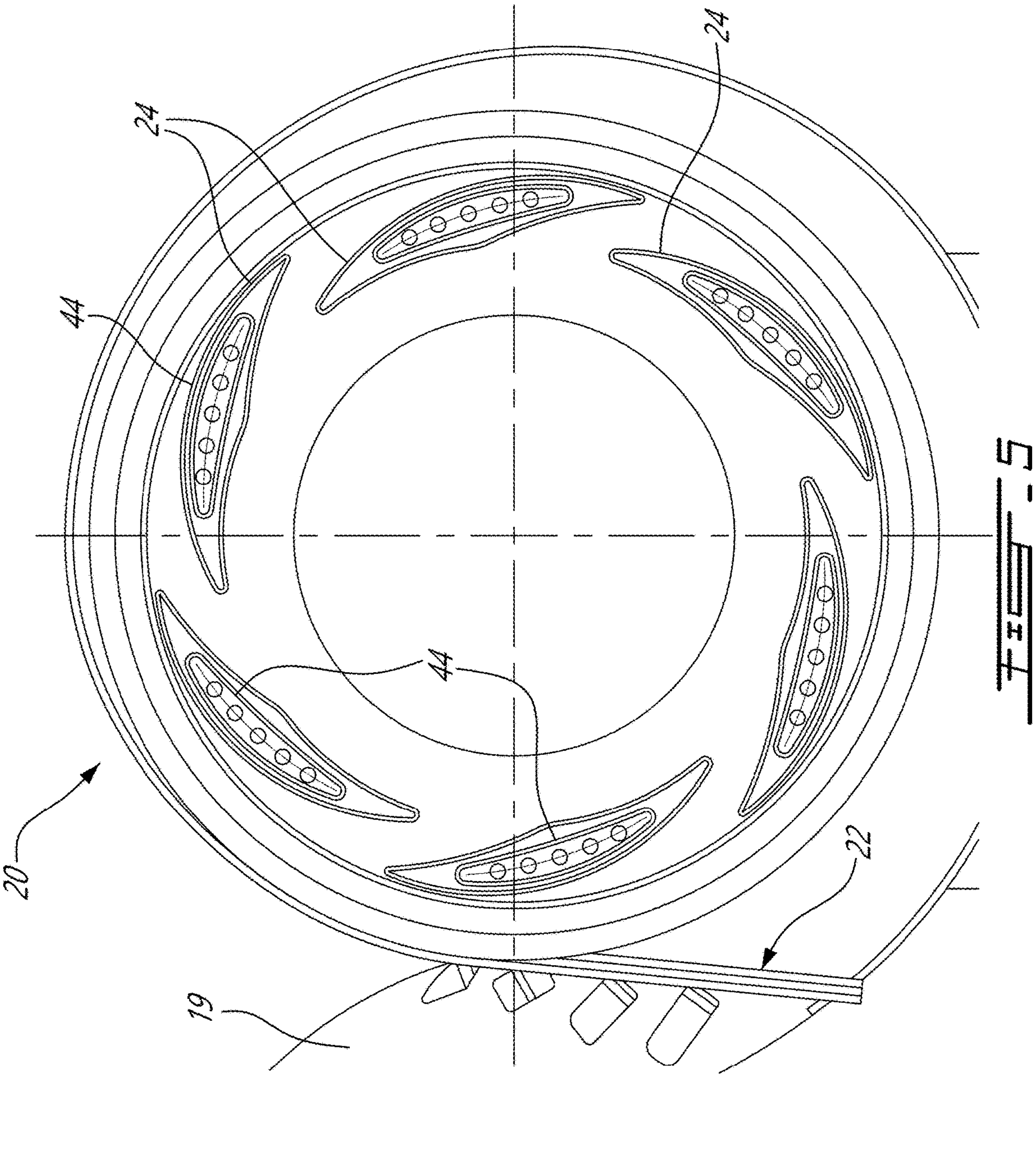
FIG. 5 is a cross-sectional view taken on a plane normal to a central axis of the aircraft engine of FIG. 1, illustrating the turbine support case and the scroll case.

Referring to FIGS. 4 and 5, in the embodiment shown, each of the spokes 44 is received within a respective one of the hollow vanes 24 of the scroll case 20. The spokes 44 therefore axially overlap the vanes 24. Thus, the spokes 44 may be isolated from combustion gases flowing through the scroll case 20 by the vanes 24. The spokes 44 may be free of connection to the vanes 24. In other words, outer surfaces of the spokes 44 may be free of contact with inner surfaces of the vanes 24. An annular gap may be provided between the inner surface of each vanes 24 and the associated spokes 44 extending internally therethrough. The vanes 24 may move axially, radially, and/or circumferentially relative to the spokes 44 without transferring any forces to the spokes 44, and vice versa. Put differently, the scroll case 20 is free from direct connection to the turbine support case 40. In other words, the scroll case 20 is free of contact, attachment, so on with the turbine support case 40. The spokes 44 of this embodiment have an elongated, airfoil-like shape to substantially match a shape of the vanes 24. However, the shape of the spokes 44 may be different. The spokes 44 may be circular, oval, square, rectangular in cross-section and so on, without departing from the scope of the present disclosure.

Figure 6:
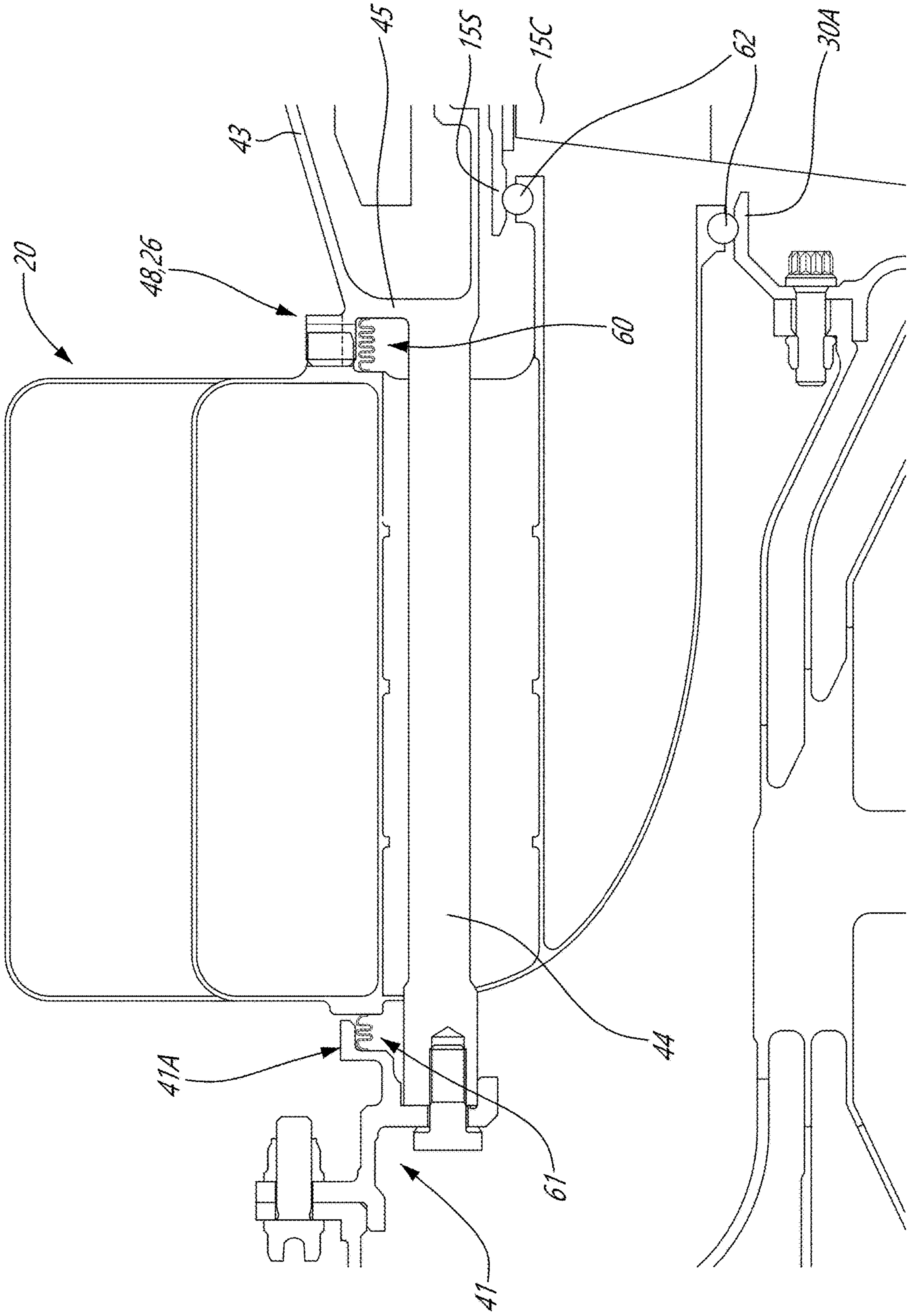
FIG. 6 is an enlarged view of a portion of FIG. 3.
Figure 8:
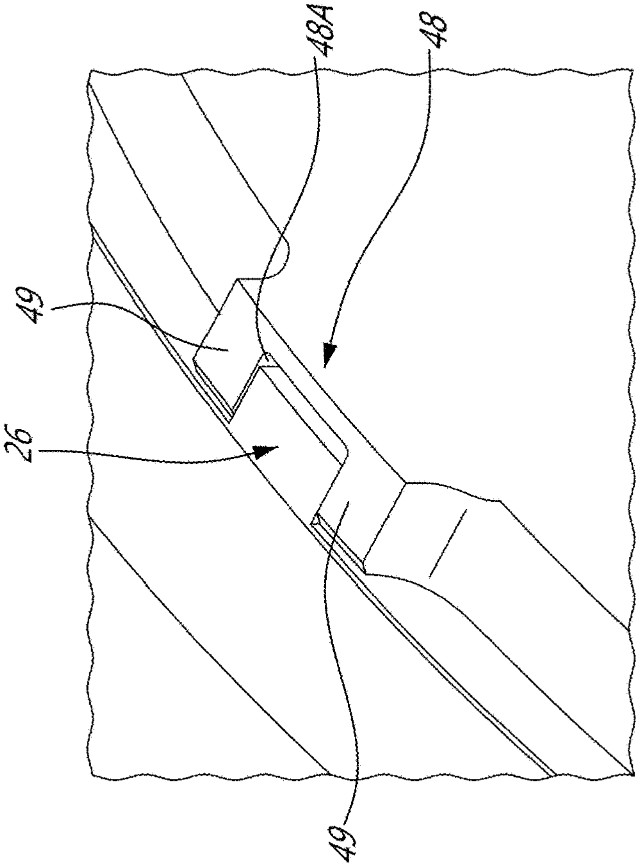
FIG. 8 is an enlarged view of a portion of FIG. 7.
Figure 7:
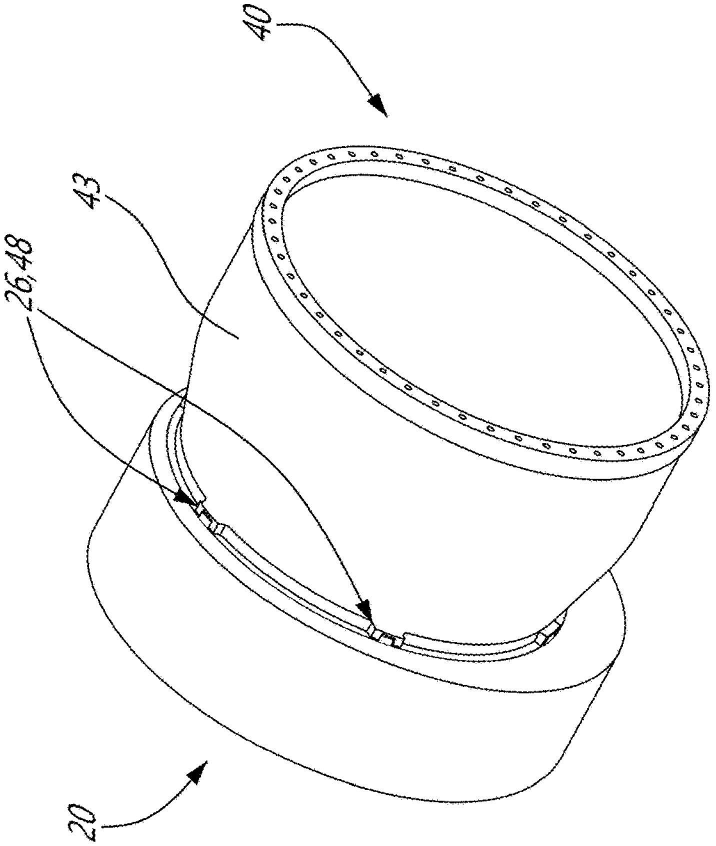
FIG. 7 is a three dimensional view of an assembly of a scroll case and of a turbine support case.

Referring now to FIGS. 6-8, it may be desired to circumferentially lock the scroll case 20 relative to the turbine support case 40 to prevent relative rotation of these two components. However, care should be taken to ensure that the scroll case 20 is able to expand radially as a result the thermal growth caused by the hot combustion gases flowing therein.

In the embodiment shown, the scroll case 20 defines lugs 26 circumferentially distributed around the central axis A1 while the turbine support case 40 defines slots 48 circumferentially distributed around the central axis A1. A number of the lugs and the slots may be at least one, preferably at least three. The lugs and slots may be equidistantly spaced from one another. The turbine support case 40 and the scroll case 20 are circumferentially locked to one another via the lugs 26 engaging the slots 48. Put differently, lug and slot connections are used to circumferentially interlock the scroll case 20 to the turbine support case 40. It will be appreciated that, in an alternate embodiment, the lugs may be defined by the turbine support case 40 while the slots are defined by the scroll case 20.

As shown more specifically on FIG. 8, the slots 48 are defined between two protrusions 49 of the turbine support case 40. The protrusions 49 protrude from the annular axial wall 45 (FIG. 6) of the turbine support case 40. The protrusions 49 may protrude axially and radially outwardly from the annular axial wall 45. In other words, each of the slots 48 is defined between two protrusions 49. In some embodiments, the slots 48 may alternatively be recesses or dimples defined by the turbine support case 40. That is, the protrusions are not needed to define the slots 48. The slots 48 have slot opening 48A that face a radially outward direction. Therefore, the scroll case 20 is movable radially relative to the turbine support case 40 via a sliding engagement of the lugs 26 within the slots 48. This sliding engagement permits the scroll case 20 to expand in diameter while heated by the combustion gases without transferring a force to the turbine support case 40. This may help in maintaining the tip clearance of the blades of the turbine substantially constant in all operating conditions since a force generated by the expanding scroll case 20 is not transmitted to the turbine support case 40, which itself supports the shrouds of the turbine 15.

Figure 9:
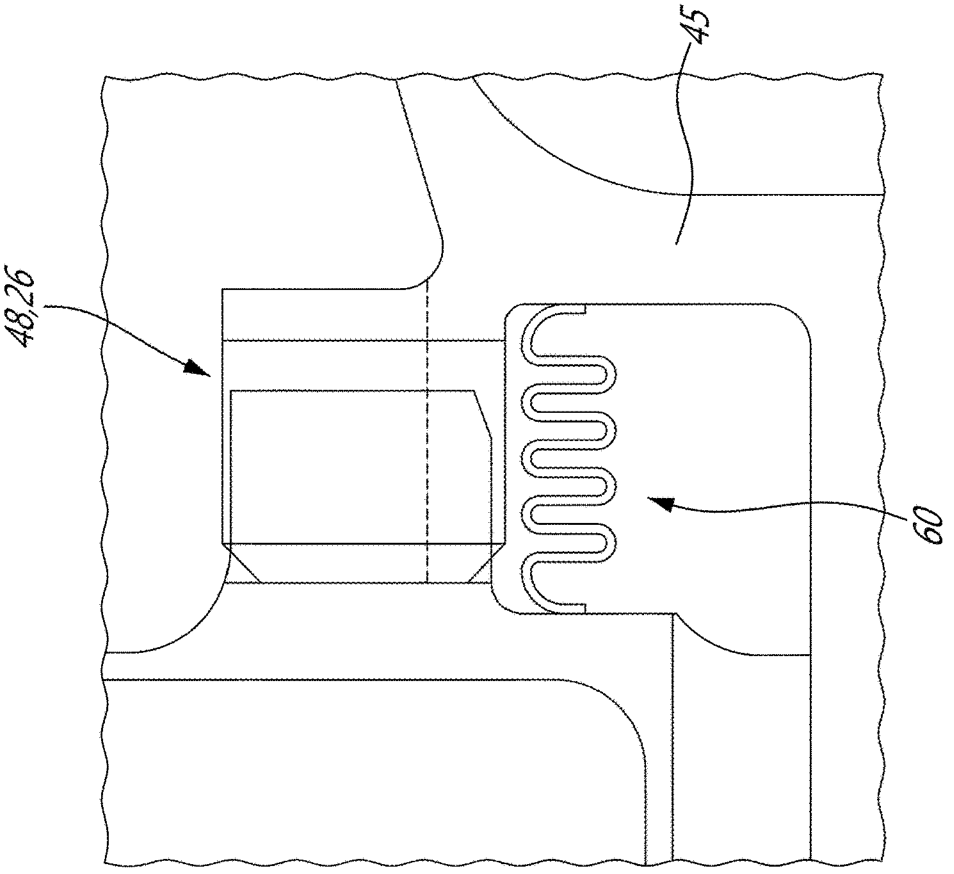
FIG. 9 is an enlarged view a portion of FIG. 6.

Referring to FIG. 9, in the embodiment shown, a first sealing member 60 is located radially inwardly of the slots 48 and of the lugs 26 and axially between the annular axial wall 45 of the turbine support case 40 and the scroll case 20. The first sealing member 60 may be a corrugated seal compressed between the scroll case 20 and the turbine support case 40 and configured for limiting leakage of combustion gases from the turbine section. Any suitable sealing member may alternatively be used. The first sealing member 60 is used to limit combustion gases from flowing between the scroll case 20 and the turbine support case 40.

Figure 10:
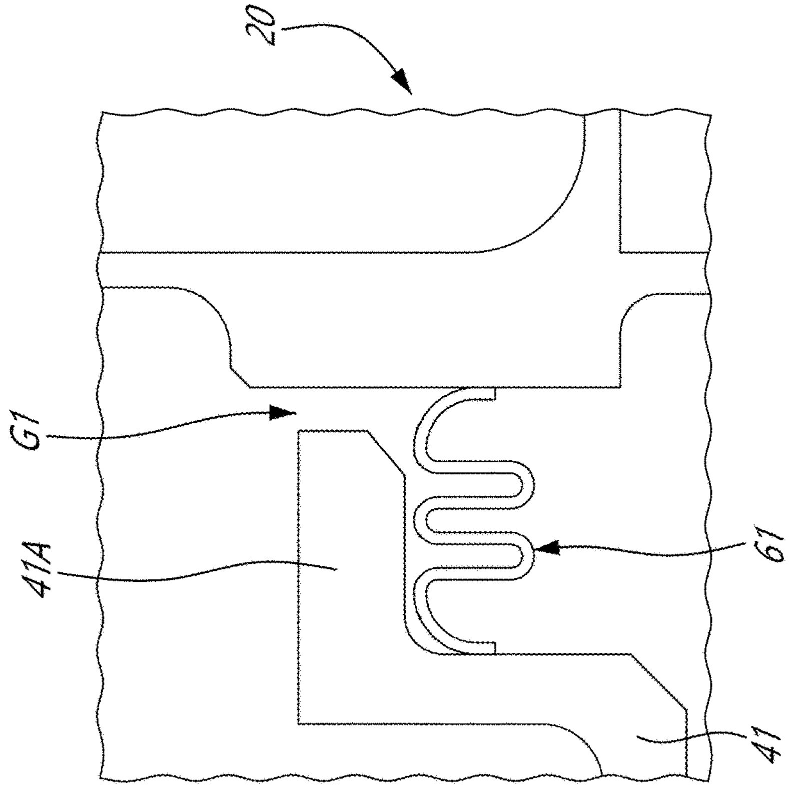
FIG. 10 is an enlarged view of another portion of FIG. 6.

As shown in FIG. 10, the annular member 41, which is secured to the bearing housing 30, and thus part of a support structure, defines an annular tab 41A located radially outwardly of the distal ends 44B the spokes 44. An annular gap G1 is defined axially between the annular tab 41A and the scroll case 20. A second sealing member 61 is located axially between the bearing housing 30 and the scroll case 20 to seal the annular gap G1 and radially inwardly of the annular tab 41A. The second sealing member 61 is configured to limit combustion gases from flowing radially outwardly between the scroll case 20 and the annular member 41. The annular tab 41A further has the function to prevent axial movements of the scroll case 20 relative to the turbine support case 40 to main the lugs 26 in engagement with the slots 48.

As shown in FIG. 6, rope seals 62, or any other suitable seals, may be used between a first wall of the scroll case 20 and a flange 30A of the bearing housing 30, and between a second wall of the scroll case 20 and a shroud 15S of the turbine assembly 15. The outlet 23 of the scroll case 20 is located radially between the first and second walls of the scroll case 20. These rope seals 62 may be used to prevent ingestion of combustion gases, and may also be used as damper to minimize vibrations generated by the flow of combustion gases through the turbine assembly 15 and the scroll case 20.

Figure 12:
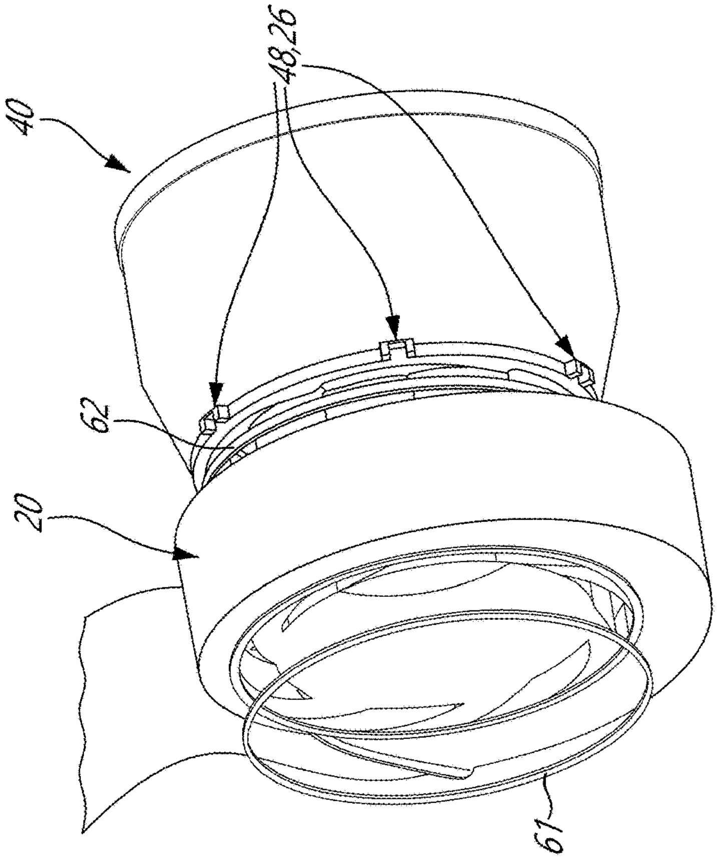
FIG. 12 is another three dimensional exploded view of the scroll case and turbine support case.
Figure 11:
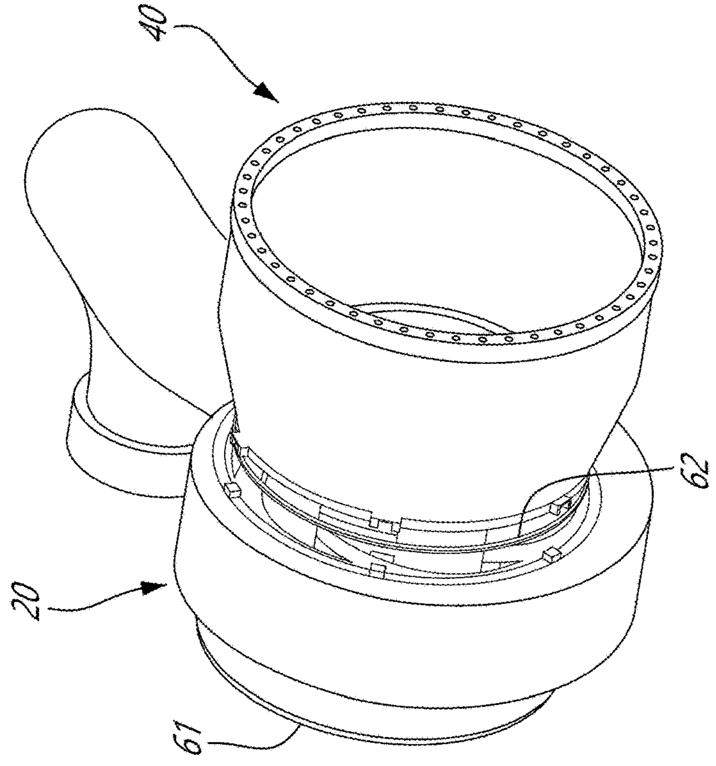
FIG. 11 is a three dimensional exploded view of the scroll case and turbine support case.

Referring to FIGS. 11-12, an assembly sequence is described. To assemble the scroll case 20 to the turbine support case 40, the first sealing member 60 is disposed around the spokes 44 and the scroll case 20 is moved axially relative to the turbine support case 40 and the spokes 44 are inserted into respective vanes of the scroll case 20. At which point, the scroll case 20 is rotated relative to the turbine support case 40 until the lugs 26 are in register with the slots 48 and the scroll case 20 is moved axially relative to the turbine support case 40 to insert the lugs 26 into the slots 48. Then, the second sealing member 61 is disposed around the distal ends 44B of the spokes 44 and an assembly of the scroll case 20 and of the turbine support case 40 may be secured to the bearing housing 30, herein via the annular member 41. In so doing, the second sealing member 61 may be disposed inwardly of the annular tab 41A.

This disclosed lug and slot interface allows radial displacement to absorb the thermal deflection generated by hot gases directed through the inner profile of the scroll. The disclosed configuration may permit free movement of the scroll case 20 in both radial and axial directions. Axial movement of the scroll air intake is limited by a control gap and the sealing members.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:

a turbine including a turbine rotor rotatable about a central axis;

a scroll case having an inlet fluidly connected to a source of combustion gases and an outlet fluidly connected to the turbine, and a conduit extending around the central axis from the inlet to the outlet;

a bearing housing extending around the central axis, the bearing housing including a support flange; and a turbine support case secured to the bearing housing, the turbine support case having spokes distributed around the central axis and extending along a direction having an axial component relative to the central axis, each of the spokes extending through the scroll case and radially supported by the bearing housing, one of the turbine support case and the scroll case defining lugs circumferentially distributed around the central axis, the other of the turbine support case and the scroll case defining slots, the turbine support case and the scroll case circumferentially locked to one another via the lugs engaging the slots.

2. The aircraft engine of claim 1, wherein the slots have slot openings facing a radial direction selected to allow radial expansion of the scroll case relative to the turbine support case, the scroll case movable radially relative to the turbine support case via a sliding engagement of the lugs within the slots.

3. The aircraft engine of claim 1, wherein the slots are defined by the turbine support case and the lugs are defined by the scroll case.

4. The aircraft engine of claim 3, wherein the turbine support case includes an annular axial wall, the spokes protruding axially from the annular axial wall, each of the slots defined between a pair of protrusions projecting from the annular axial wall.

5. The aircraft engine of claim 1, comprising a sealing member located radially inwardly of the slots and of the lugs and axially between an annular axial wall of the turbine support case and the scroll case.

6. The aircraft engine of claim 5, wherein the sealing member is a corrugated seal.

7. The aircraft engine of claim 1, wherein the support flange defines an annular tab located radially outwardly of the spokes, an annular gap defined axially between the annular tab and the scroll case, a sealing member located axially between the bearing housing and the scroll case to seal the annular gap and radially inwardly of the annular tab.

8. The aircraft engine of claim 1, wherein the scroll case includes vanes extending in a direction having an axial component relative to the central axis and across the conduit.

9. The aircraft engine of claim 8, wherein each of the spokes extends within a respective one of the vanes.

10. The aircraft engine of claim 9, wherein each of the spokes are free of connection to the respective one of the vanes.

11. A turbine assembly, comprising:

a turbine including a turbine rotor rotatable about a central axis;

a support structure;

a scroll case for receiving combustion gases and for directing the combustion gases to the turbine, the scroll case having a conduit extending around the central axis; and a turbine support case having spokes distributed around the central axis, each of the spokes extending through the conduit of the scroll case and radially supported by the support structure, and lug and slot connections defined between the turbine support case and the scroll case to circumferentially lock the turbine support case to the scroll case.

12. The turbine assembly of claim 11, wherein the lug and slot connections includes slots defined by one of the turbine support case and the scroll case, and lugs defined by the other of the turbine support case and the scroll case, the slots having slot openings facing a radial direction to allow expansion of the scroll case relative to the turbine support case, the scroll case movable radially relative to the turbine support case via a sliding engagement of the lugs within the slots.

13. The turbine assembly of claim 12, wherein the slots are defined by the turbine support case and the lugs are defined by the scroll case.

14. The turbine assembly of claim 13, wherein the turbine support case includes an annular axial wall, the spokes protruding axially from the annular axial wall, each of the slots defined between a pair of protrusions projecting from the annular axial wall.

15. The turbine assembly of claim 11, comprising a sealing member located radially inwardly of the slots and of the lugs and axially between an annular axial wall of the turbine support case and the scroll case.

16. The turbine assembly of claim 15, wherein the sealing member is a corrugated seal.

17. The turbine assembly of claim 11, wherein the support structure defines an annular tab located radially outwardly of the spokes, an annular gap defined axially between the annular tab and the scroll case, a sealing member located axially between the support structure and the scroll case to seal the annular gap and radially inwardly of the annular tab.

18. The turbine assembly of claim 11, wherein the scroll case includes vanes extending in a direction having an axial component relative to the central axis and across the conduit.

19. The turbine assembly of claim 18, wherein each of the spokes extends within a respective one of the vanes.

20. The turbine assembly of claim 19, wherein each of the spokes are free of connection to the respective one of the vanes.

* * * * *